US010194307B2

United States Patent
Fu et al.

(10) Patent No.: US 10,194,307 B2
(45) Date of Patent: Jan. 29, 2019

(54) COORDINATION OF WIRELESS DEVICES BETWEEN PERSONAL AREA NETWORKS AND VEHICLE AREA NETWORKS

(71) Applicant: MOTOROLA SOLUTIONS, INC., Chicago, IL (US)

(72) Inventors: Houchao Fu, Sichuan (CN); Huimin Han, Sichuan (CN); Haiqing Hu, Sichuan (CN); Qinzhi Wang, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/753,230

(22) PCT Filed: Aug. 31, 2015

(86) PCT No.: PCT/CN2015/088694
§ 371 (c)(1),
(2) Date: Feb. 16, 2018

(87) PCT Pub. No.: WO2017/035764
PCT Pub. Date: Mar. 9, 2017

(65) Prior Publication Data
US 2018/0242134 A1  Aug. 23, 2018

(51) Int. Cl.
*H04W 4/44* (2018.01)
*H04W 4/46* (2018.01)
(Continued)

(52) U.S. Cl.
CPC .............. *H04W 8/005* (2013.01); *H04W 4/44* (2018.02); *H04W 4/46* (2018.02); *H04W 8/26* (2013.01);
(Continued)

(58) Field of Classification Search
CPC ....... H04W 48/16; H04W 4/046; H04W 4/44; H04W 4/46; H04W 76/11; H04W 84/18; H04W 8/005; H04W 8/26
See application file for complete search history.

(56) References Cited

U.S. PATENT DOCUMENTS 7,894,387 B2    2/2011  Paryani
7,911,990 B2 *  3/2011  Alam ................... H04W 84/18
                                                              370/312
(Continued)

FOREIGN PATENT DOCUMENTS

CN         101088258        12/2007

OTHER PUBLICATIONS

Examination Report from the Canadian Intellectual Property Office for Application No. 2,995,729 dated Jul. 19, 2018 (3 pages).
(Continued)

*Primary Examiner* — Kashif Siddiqui (57) ABSTRACT

A method and apparatus for coordinating linkable wireless devices operable in a personal area network (PAN) and a vehicle area network (VAN). The method includes the operations of detecting, by a vehicle host device of a VAN, a PAN within a range of the VAN, pairing one or more linkable wireless devices of the PAN to the vehicle host device, creating a PAN identification code and adding the PAN identification code to a list of PANs having linkable wireless devices paired with the VAN, determining a working channel of the PAN and adding the working channel to a scan list in the vehicle host device, and providing a communication link between the linkable wireless devices and a remote device via the vehicle host device. The linkable wireless devices of the PAN are associated with the PAN identification code and the working channel.

16 Claims, 10 Drawing Sheets

(51) Int. Cl.
   *H04W 8/00*    (2009.01)
   *H04W 8/26*    (2009.01)
   *H04W 48/16*   (2009.01)
   *H04W 76/11*   (2018.01)
   *H04W 84/18*   (2009.01)
   *H04W 4/04*    (2009.01)

(52) U.S. Cl.
   CPC ............ *H04W 48/16* (2013.01); *H04W 76/11* (2018.02); *H04W 4/046* (2013.01); *H04W 84/18* (2013.01)

(56) References Cited

U.S. PATENT DOCUMENTS

| | | |
|---|---|---|
| 8,194,663 B2 | 6/2012 | Lee et al. |
| 8,682,317 B2 | 3/2014 | Pinder |
| 9,654,938 B2 | 5/2017 | Tang et al. |
| 2007/0032225 A1* | 2/2007 | Konicek ........... H04M 1/72513 455/417 |
| 2007/0042812 A1 | 2/2007 | Basir |
| 2008/0081675 A1* | 4/2008 | Pinder .................. H03J 1/0091 455/574 |
| 2015/0230073 A1 | 8/2015 | Pandey et al. |

OTHER PUBLICATIONS

PCT/CN2015/088694 International Search Report and Written Opinion of the International Searching Authority dated May 26, 2016 (11 pages).
Examination Report from the Intellectual Property Office of Australia for Application No. 2015407309 dated Mar. 6, 2018 (2 pages).
Examination Report from the Intellectual Property Office of Great Britain for Application No. 1802044.6 dated Mar. 16, 2018 (1 page).

\* cited by examiner

FIG. 1

PRIOR ART

COORDINATION OF WIRELESS DEVICES BETWEEN PERSONAL AREA NETWORKS AND VEHICLE AREA NETWORKS

BACKGROUND OF THE INVENTION

Figure 1:
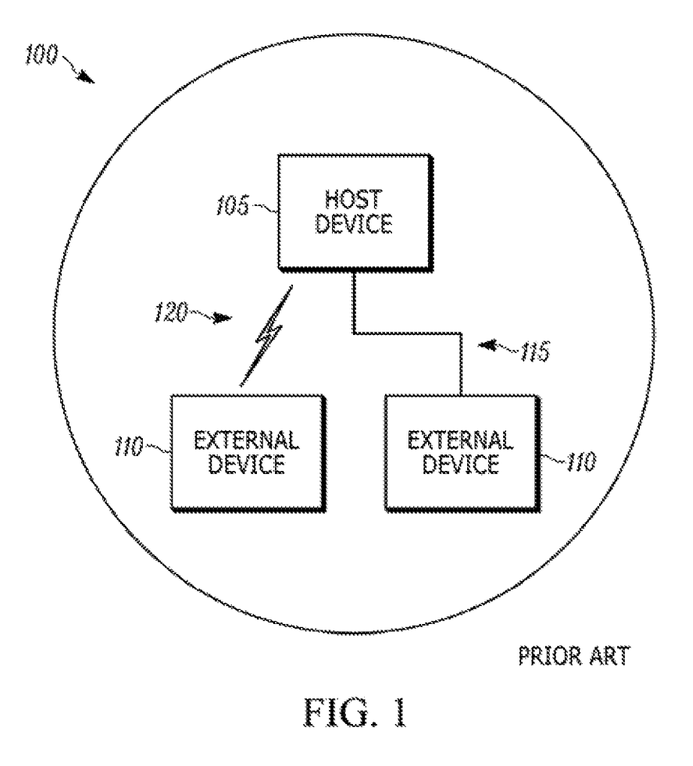
FIG. 1 is a block diagram of a personal area network.

FIG. 1 is a block diagram of a personal area network (PAN) 100. A PAN is a network organized around a single individual. The PAN 100 includes a host device 105, and one or more external devices 110. The host device 105 communicates with the one or more external devices 110 (either via a wired communication channel 115 or a wireless communication channel 120). The host device 105 can be a computer, a portable cellular telephone, a radio, or other device capable of acting as a host for one or more external devices 110. The external devices 110 can be a hard drive, a printer, a remote speaker/microphone (RSM), a video camera, or other device that communicates to the host device 105.

In the public safety realm, personal area networks are often used to interconnect communication equipment used by first responders (e.g., a police officer or a firefighter). For instance, a personal area network may be used to interconnect a wireless microphone and a wireless earphone with a communication device, such as two-way radio. It is also possible that the communication devices associated with other individuals may connect to the personal area network. Another kind of network, that is similar to a PAN, but usually includes a mounted transceiver hat supports communications among multiple devices that are each associated with unique individuals, is a vehicle area network (VAN). As its name implies, a vehicle area network is associated with a vehicle (for example, a police vehicle or fire truck) and usually relies on a vehicle-mounted mounted transceiver (for example, a vehicle network modem, gateway, or access point). Communication equipment associated with passengers in or around a vehicle may communicate with each other using communication links supported by the vehicle-mounted transceiver. When the vehicle-mounted transceiver has a capability to communicate with other networks (for example, a cellular network), then the vehicle area network may also support communications with devices located remotely from the vehicle. It may be desirable for devices not associated with the vehicle area network to utilize communication links provided by the vehicle area network.

Thus, there is a need for coordination of wireless devices between personal area networks and vehicle area networks.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of coordinating linkable wireless devices operable in a personal area network (PAN) and a vehicle area network (VAN). The method includes the steps of detecting, by a vehicle host device of a VAN, a portable host device within a range of the VAN, pairing one or more linkable wireless devices of the PAN to the vehicle host device, creating a PAN identification code and adding the PAN identification code to a list of PANs having linkable wireless devices paired with the VAN, determining a working channel of the PAN and adding the working channel to a scan list in the vehicle host device, and providing a communication link between the linkable wireless devices and a remote device via the vehicle host device. The linkable wireless devices of the PAN are associated with the PAN identification code and the working channel.

Another embodiment provides a wireless communication system. In one example, the system includes a personal area network (PAN) and a vehicle area network (VAN). The PAN includes a portable host device and one or more linkable wireless devices paired to the portable host device. The VAN includes a vehicle host device. When the portable host device comes into a range of the VAN, the one or more linkable wireless devices of the PAN are paired with the vehicle host device; and a communication link is provided between the linkable wireless devices and a remote device via the vehicle host device. The vehicle host device creates a PAN identification code and adds the PAN identification code to a list of PANs having linkable wireless devices paired with the VAN. The vehicle host device also determines a working channel of the PAN and adds the working channel to a scan list.

Figure 2:
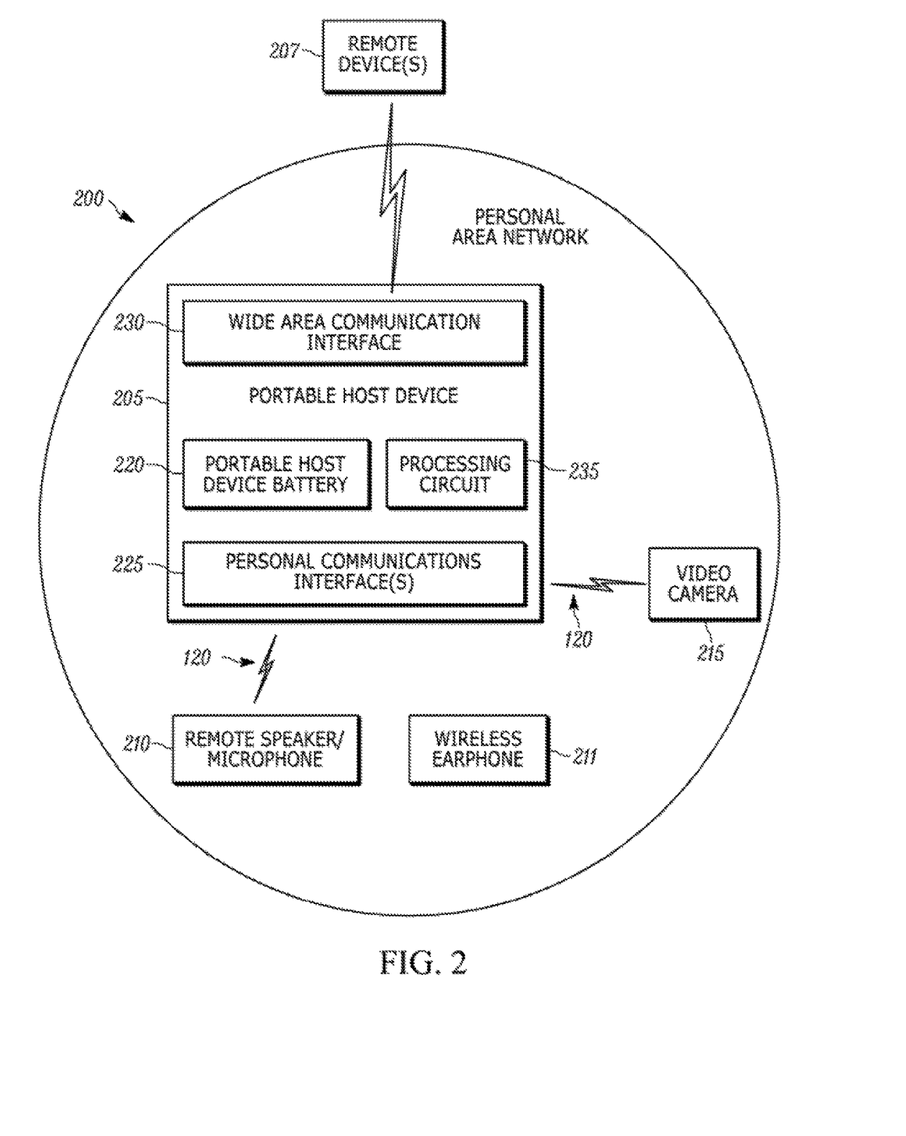
FIG. 2 is a block diagram of a personal area network (PAN) in accordance with some embodiments.

FIG. 2 is a block diagram of a PAN 200. The PAN 200 includes a portable host device 205 (PHD) (e.g., a portable radio or portable cellular telephone). The portable host device 205 may be carried by a police officer, fire fighter, or other public safety user. The PAN 200 includes a number of linkable wireless devices that are used to communicate information to the portable host device 205. In turn, the portable host device 205 communicates with one or more remote devices 207 (e.g., another mobile radio or portable cellular telephone). The linkable wireless devices can include a remote speaker/microphone (RSM) 210 (e.g., a Bluetooth® RSM), a video camera 215, a wireless speaker (not shown), a wireless earphone 211 (shown schematically in FIG. 2), or other device.

The portable host device 205 includes a portable host device battery 220, one or more personal communication interfaces 225 (e.g., a communication interface designed to work over a relatively short distance (for example, a few feet to tens of feet) such as a Bluetooth® interface or a near field communication interface), one or more wide area (e.g., measured in miles) communication interfaces 230 (e.g., an radio frequency (RF) interface, a cellular interface, a satellite interface), and processing circuitry 235. In certain embodiments, the portable host device battery 220 is generally a small rechargeable battery. As a consequence, the portable host device battery may be depleted of charge relatively quickly and conserving battery charge may be important when operating the portable host device 205.

Figure 3:
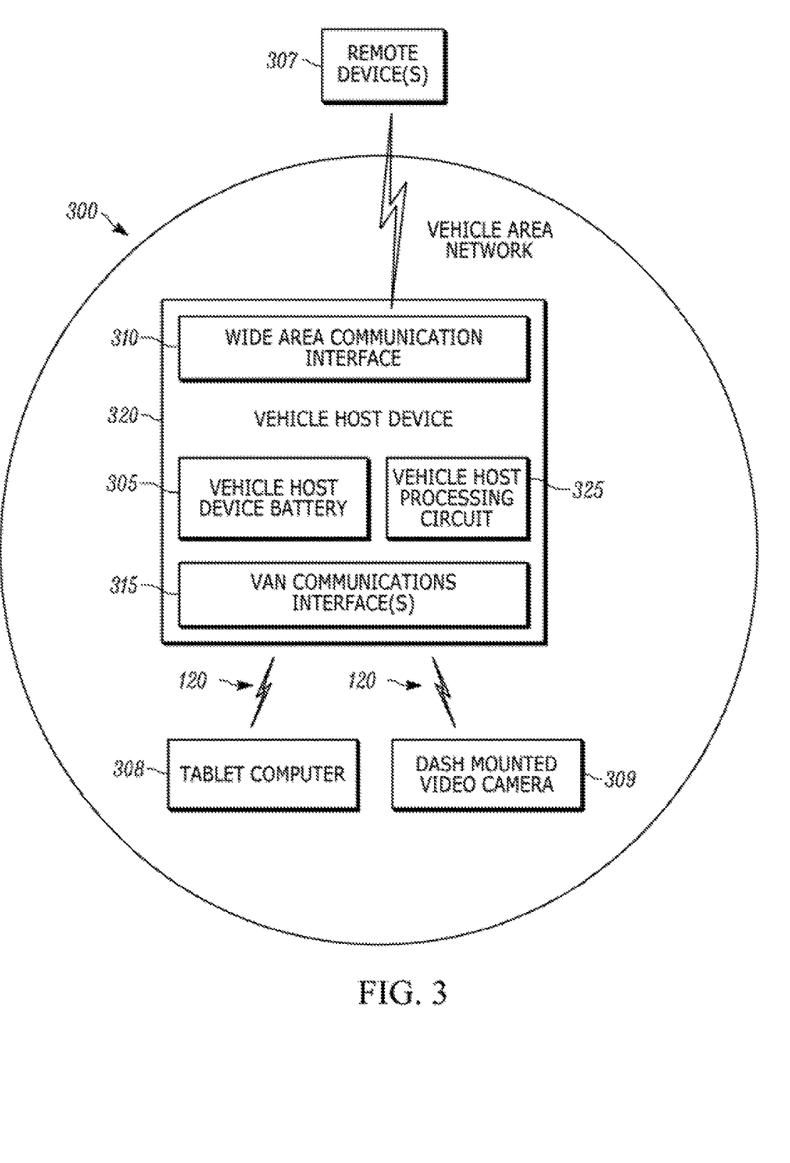
FIG. 3 is a block diagram of a vehicle area network (VAN) in accordance with some embodiments.

FIG. 3 is a block diagram of a vehicle area network (VAN). The VAN 300 includes a vehicle host device 305 (MHD) (e.g., a radio). The VAN 300 also includes linkable wireless devices that are used to communicate information to the vehicle host device 305. In turn, the vehicle host device communicates with one or more remote devices 307 (e.g., another radio or remote monitoring station). The linkable wireless devices can include a tablet computer 308 and a dash mounted video camera 309, and the like.

The vehicle host device 305 is coupled to a vehicle host device battery 310. The vehicle host device battery 310 is illustrated as being located with the host device 305, but in certain embodiments, an external battery such as the vehicle battery is used to power the host device 305 The vehicle host device 305 includes one or more VAN communication interfaces 315 (e.g., a communication interface designed to work over a relatively short distance (for example, a few feet to tens of feet) such as a Bluetooth® interface or a near field communication protocol), one or more wide area (e.g., measured in miles) communication interfaces 320 (e.g., an RF interface, a cellular telephone interface, a satellite interface, a land mobile radio interface, a long term evolution (LTE) interface), and vehicle host processing circuitry 325. Even though it is possible for the portable host device 205 and the vehicle host device 305 to have similar capabilities, it is often the case that the wide area communication interfaces 320 have greater capabilities than the personal communication interfaces and that the VAN communication interfaces have higher bandwidth and ranges than the personal communication interfaces of a typical portable host device 205. In addition, the vehicle host device battery 310 typically has a larger capacity than the portable host device battery 220.

In one example implementation, the vehicle host device 305 is mounted in a police vehicle and communicates with, among other devices, dash mounted video camera 309 and the portable host devices of one or more police officers riding in the police vehicle. As will be described in greater detail, it is also possible for the vehicle host device 305 to communicate with the linkable wireless devices such as RSMs 210 worn by, for example, police officers riding in the police vehicle.

When a person having a portable host device 205 moves into range of a VAN 300, it is desirable to have the linkable wireless devices 210 and 215 of the PAN 200 link to the VAN 300 such that the portable host device 205 can go into a sleep mode (i.e., a power saving mode) and conserve the power of the PAN battery 220. In addition, linking the linkable wireless devices 210 and 215 of the PAN 200 to the VAN 300 enables the linkable wireless devices 210 and 215 to use the more powerful VAN wide area communication interfaces 320 to communicate with remote devices 307.

Embodiments coordinate the pairing of linkable wireless devices 210 and 215 of the PAN 200 with the VAN 300 and the re-pairing of the linkable wireless devices 210 and 215 to the PAN 200.

Figure 4A:
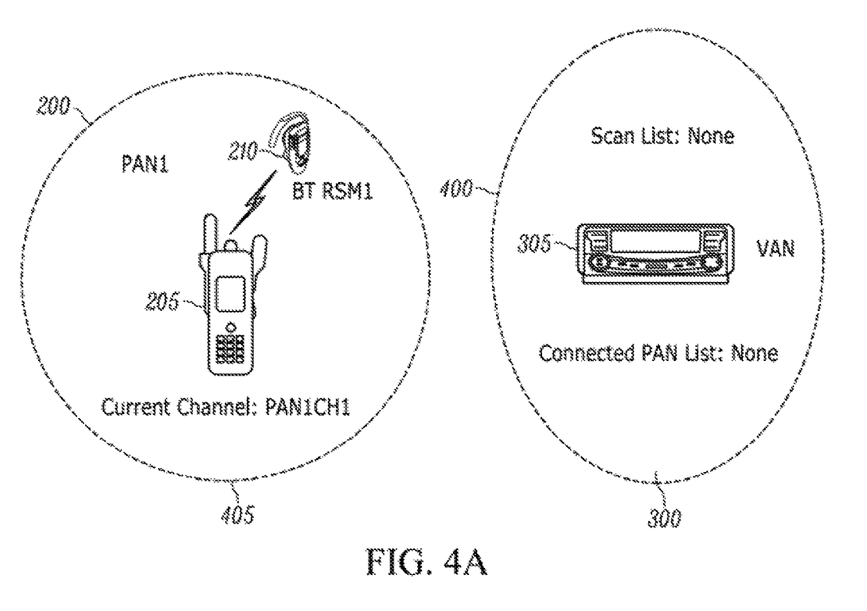
FIGS. 4A through 4E are block diagrams of linkable wireless devices of a PAN being paired with a VAN in accordance with some embodiments.
Figure 4B:
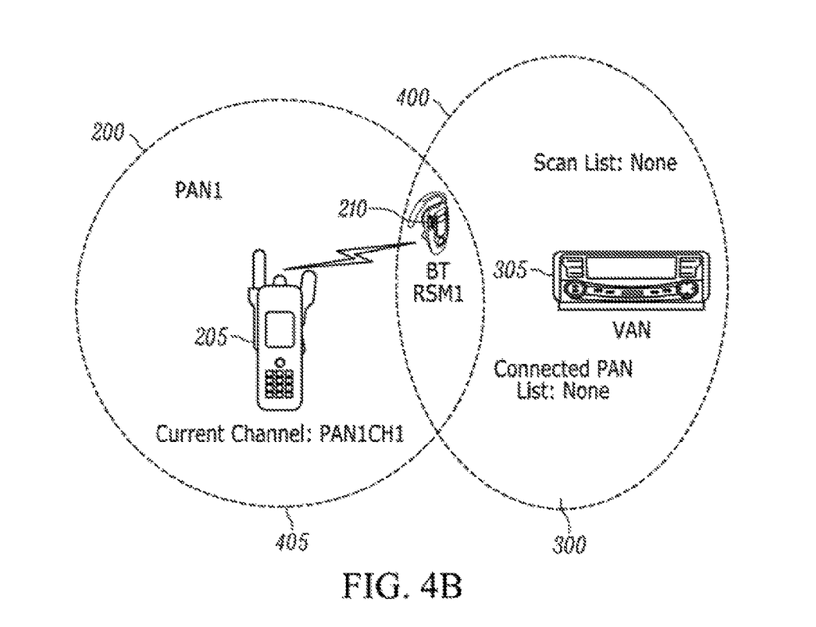
Figure 4C:
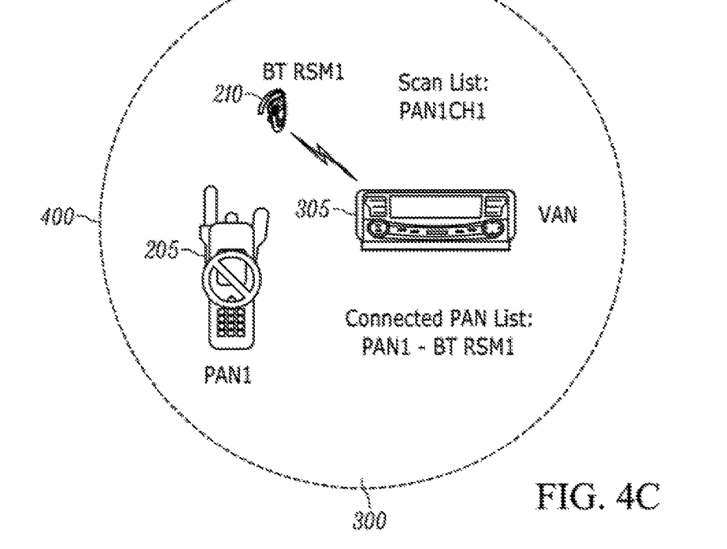
Figure 4D:
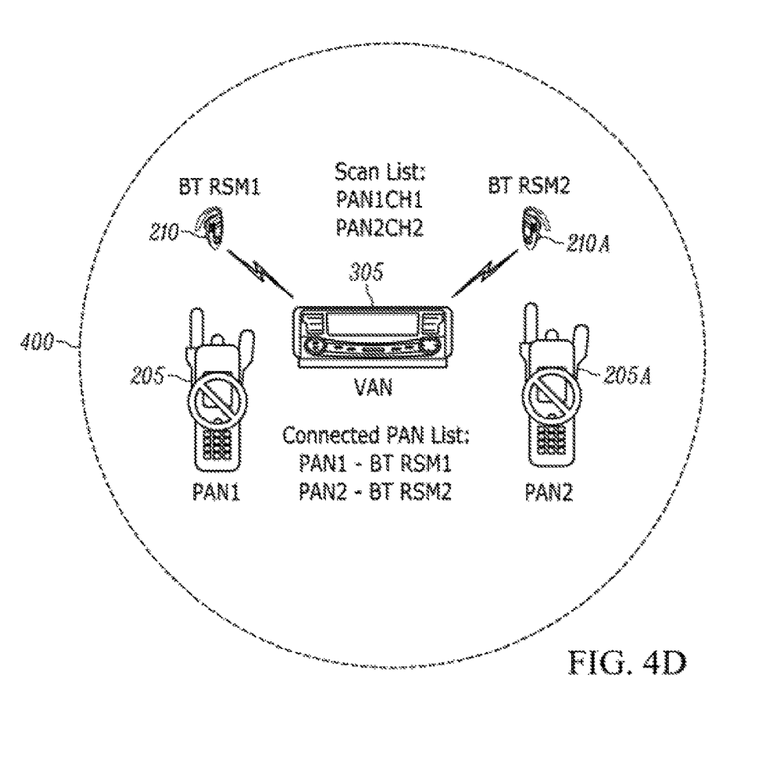
Figure 4E:
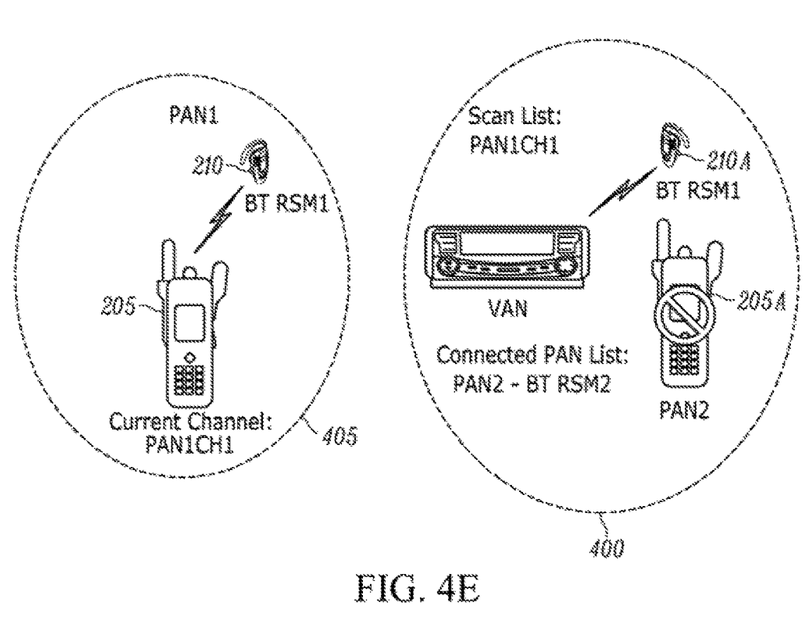

FIGS. 4A through 4E illustrate exemplary pairing and re-pairing of linkable wireless devices 210 with the VAN 300 and PAN 200. As shown in each of FIGS. 4A through 4E, the vehicle host device 305 has a transmission and reception range, which provides a certain VAN coverage 400 which is illustrated by a first circle. As best seen in FIGS. 4A, 4B, and 4E, the portable host device 205 has a transmission and reception range 405, which provides a certain PAN coverage 405 (and which is illustrated by a second circle. In FIG. 4A, an RSM 210 is in the PAN 200 and linked to the portable host device 205.

In FIG. 4B, the portable host device 205 has moved close enough to the VAN 300 that the PAN coverage 405 overlaps with the VAN coverage 400 (e.g., a police officer with a portable radio and a Bluetooth® RSM enters a police vehicle). The vehicle host device 305 coordinates with the portable host device 205 and the RSM 210 to pair the RSM 210 with the vehicle host device 305. The portable host device 205 then goes into a sleep mode while the vehicle host device 305 interfaces with the RSM 210. Thus, the VAN 300 is linked to the RSM 210 of the PAN 200 as shown in FIG. 4C and the vehicle host device 305 acts as a proxy for the portable host device 205.

The VAN 300 is capable of pairing with multiple linkable wireless devices from multiple PANs. As shown in FIG. 4D, when a second portable host device 205A (linked to a second wireless earphone RSM 210A), comes within range of the VAN 300 (e.g., a second police officer with a portable radio and RSM 210A enters the police vehicle), the vehicle host device 305 coordinates with the second portable host device 205A and the second RSM 210A to transfer the communication settings and the link to the second RSM 210A to the vehicle host device 305 (i.e., to pair the second RSM 210A to the vehicle host device 305). The second portable host device 205A then goes into a sleep mode while the vehicle host device 305 interfaces with the second RSM 210A.

FIG. 4E shows the operation of the PAN 200 and VAN 300 when the portable host device 205 moves beyond the VAN coverage 400 (e.g., the police officer with a portable radio and a Bluetooth® RSM leave the police vehicle). As the portable host device 205 nears the edge of the VAN coverage 400, the portable host device 205 wakes up (e.g., a low power circuit in the portable host device 205 detects a decreasing signal strength of one of the VAN communication interfaces 315 and powers up the portable host device 205). The vehicle host device 305 coordinates with the portable host device 205 and the RSM 210 to transfer the communication settings and the link to the RSM 210 back to the portable host device 205. Linkable wireless devices of the second PAN 200A remain paired with the VAN 300.

Figure 5A:
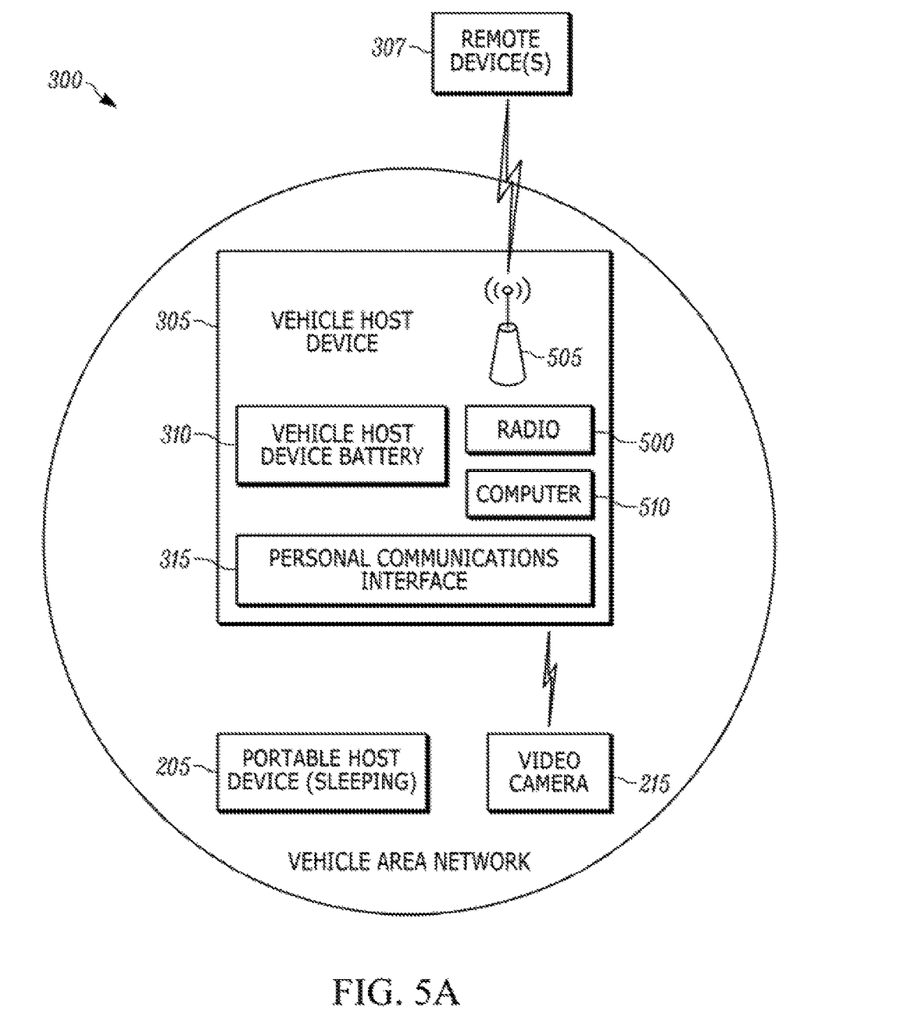
FIG. 5A is a block diagram of a VAN with paired linkable devices of a PAN in accordance with some embodiments.

FIG. 5A shows a portable host device 205 and a video camera 215 that has been paired with a VAN 300. The VAN 300 includes a vehicle host device 305 having a radio 500, a long term evolution (LTE) modem 505, and a computer 510. The computer 510 is capable of receiving images from the video camera 215 and processing the images. For example, the computer 510 can analyze the video (e.g., object detection) and based on the analysis transmit selected video frames to a remote device. The computer 510 can also "clean" the video before transmission to the remote device 307, removing noise from the video stream.

Figure 5B:
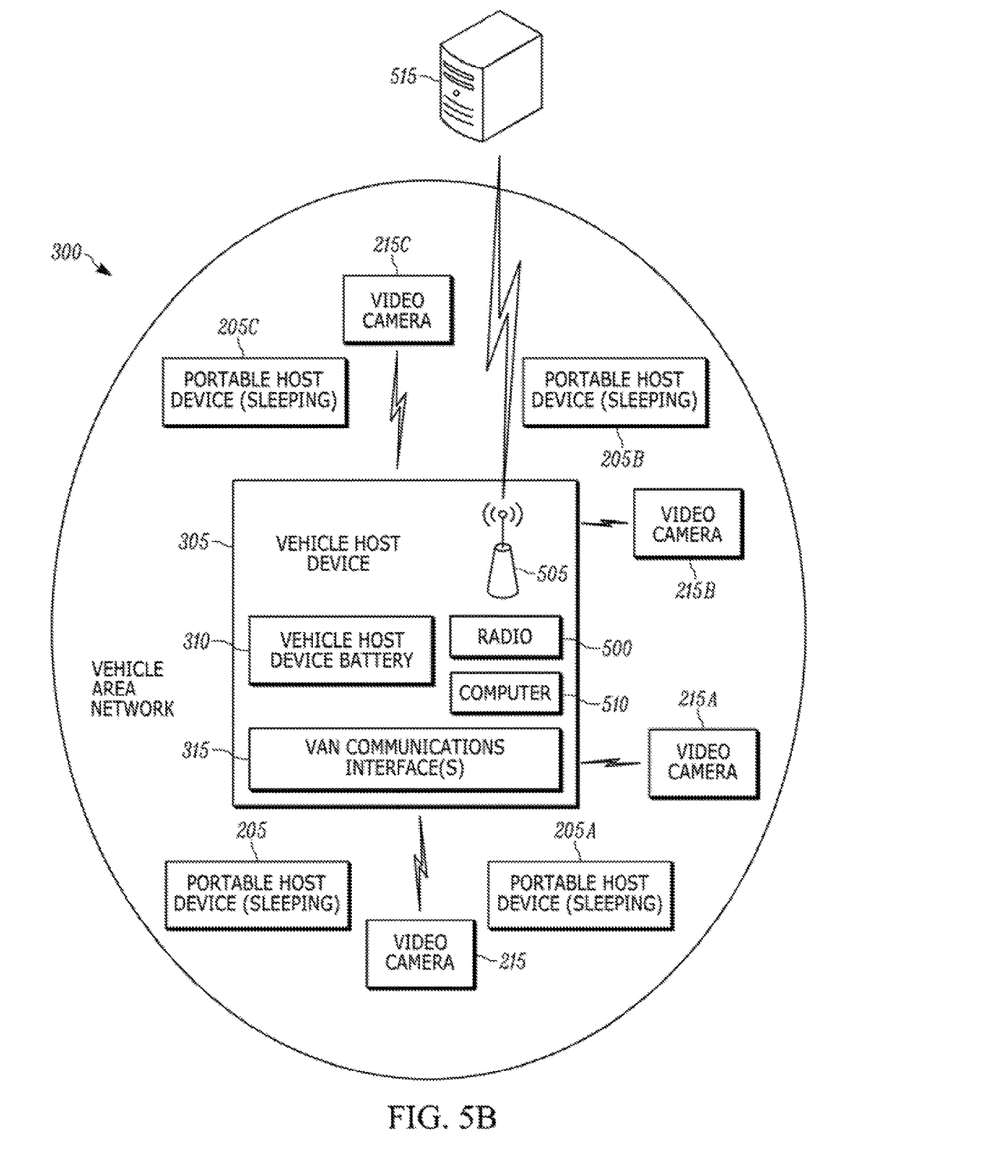
FIG. 5B is a block diagram of a VAN paired with linkable devices of four PANs in accordance with some embodiments.

FIG. 5B shows a VAN 300 that has paired with linkable wireless devices from multiple PANs. In this case, video cameras 215, 215A, 215B, and 215C from four PANs are paired with the vehicle host device 305. The vehicle host device 305 can combine the video streams for the four video cameras 215, 215A. 215B, and 215C and transmit the combined video streams to a public safety network server 515. For example, four police officers with body mounted cameras could be standing just outside a police vehicle (i.e., still in the range of the VAN 300) with the body mounted cameras pointing in four different directions. The vehicle host device 305 can combine the video streams from the body mounted cameras to provide a 360 degree panoramic image to the public safety network server 515.

Figure 6:
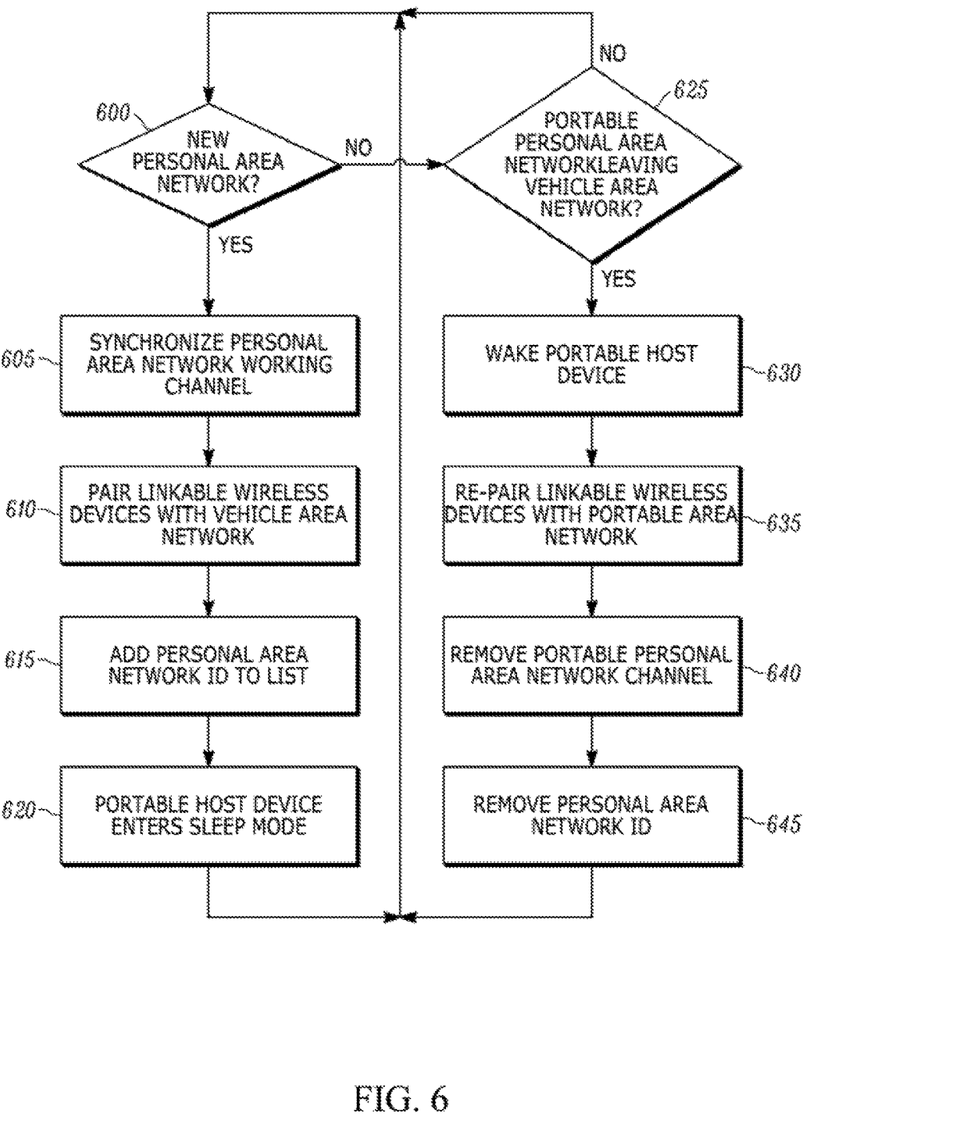
FIG. 6 is a flowchart of a method of pairing linkable wireless devices of a PAN with a VAN in accordance with some embodiments.

FIG. 6 is a flow chart depicting the pairing of the linkable wireless devices of the PAN 200 with the VAN 300 and the subsequent transfer of control back to the portable host device 205 when the PAN 200 moves beyond the VAN coverage 400. The vehicle host device 305 checks for the presence of a new PAN 200 (i.e., a PAN 200 from which linkable wireless devices have not been paired with the vehicle host device 305) within the VAN coverage 400 (600).

When a new PAN 200 is detected, the vehicle host device 305 creates an entry in a scan list for the PAN 200 and synchronizes a working channel of the PAN 200 with the entry in the scan list (605). Next, the vehicle host device 305 pairs any linkable wireless devices (e.g., RSM 210 and camera 215) of the PAN 200 with the VAN 300 (610). This includes any necessary authentication, authorization, or other functions necessary for the pairing of the specific linkable wireless devices to the VAN 300 (e.g., as required by Bluetooth®).

The vehicle host device 305 then creates a unique PAN ID or identification code and adds the code to a PAN list (615). The PAN list is a list of codes for all of the PANs 200 presently paired with the VAN 300. The portable host device 205 then enters a sleep mode (620) and operation loops back to block 600. It is understood that a portable host device 205 may be within the VAN coverage 400 but that one or more linkable wireless devices associated with the PAN 200 may be out of the VAN coverage 400. The linkable wireless devices are paired with the vehicle host device 305 as they come within VAN coverage 400 and the portable host device 205 does not enter a sleep mode until all of its linkable wireless devices are within the VAN coverage 400 and have been paired with the vehicle host device 305.

When a PAN 200 is not detected at block 600, one or both of the vehicle host device 305 and the portable host device 205 checks to determine when the portable host device 205 is leaving the VAN (625). In other words, a check is performed to determine when the portable host device is moving away from the vehicle host device 305 and is nearing the edge of the VAN coverage 400 such that the portable host device 205 needs to wake up and the associated linkable wireless devices need to be re-paired with the portable host device 205.

When the portable host device 205 is not nearing the edge of the VAN 300, operation loops back to block 600 to continue checking for a new PAN 200. When the portable host device 205 is nearing the edge of the of the VAN coverage 400, the portable host device wakes up (630) and the linkable wireless devices associated with PAN 200 are re-paired with the portable host device 205 (635). The portable host device can awakened in any suitable way such when a circuit of the portable host device 205 detects a weakening signal strength of the VAN communication interface 315 or by receiving a "wake up" signal from the vehicle host device 305.

The vehicle host device 305 then removes the entry in scan list associated with the PAN 200 that is leaving the VAN 300 (640) and removes the entry of the PAN ID associated with the PAN 200 that is leaving the VAN 300 from the PAN list (645). Operation then loops back to block 600 to continue checking for a new PAN 200.

Figure 7:
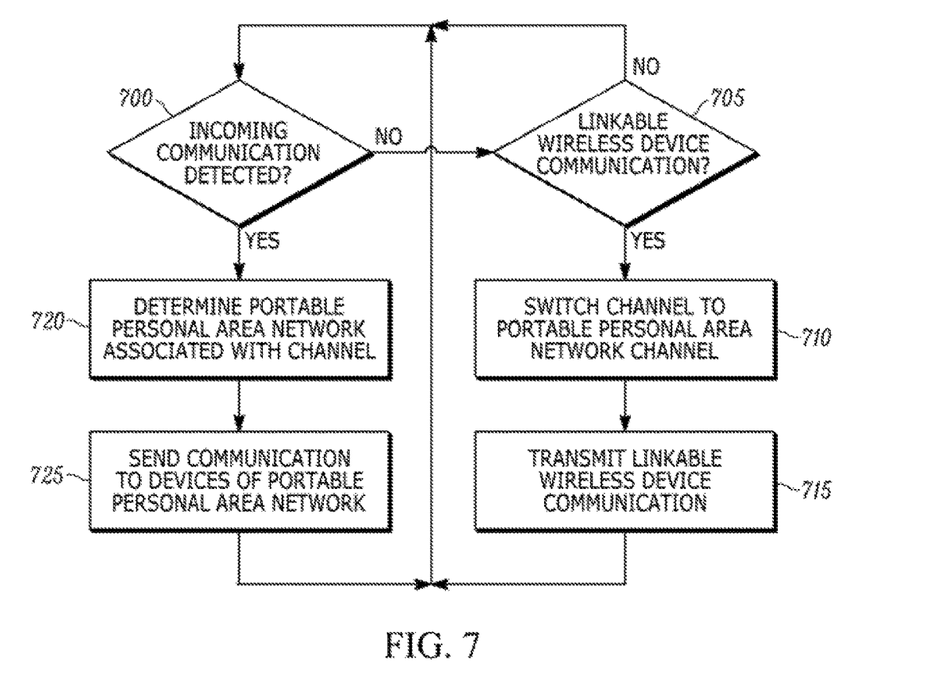
FIG. 7 is a flowchart of a method of communication of a linkable wireless device of a PAN that has been paired with a VAN in accordance with some embodiments.

FIG. 7 is a flow chart of the operation of the vehicle host device 305 with a paired RSM 210 of a PAN 200. The vehicle host device 305 scans the working channels in the scan list to determine whether an incoming communication is detected (700). When there is no incoming communication on the scanned channels, the vehicle host device 305 checks for an indication of a communication from a linkable wireless device (705) such as the RSM 210. When a communication from a linkable wireless device is occurring, the vehicle host device 305 switches its working channel to the working channel of the associated PAN 200 (i.e., from the scan list) (710) and transmits the linkable wireless device communication on the working channel (715). The vehicle host device 305 then returns to scan for incoming communication (700).

When there incoming communication is detected at block 700, the vehicle host device 305 looks through the scan list to determine which PAN 200 is associated with the working channel (720). The vehicle host device 305 then sends the communication to the linkable wireless device(s) of the associated PAN 200 (725) and returns to scan for incoming communication (700).

Other wireless technologies applicable to the linkable wireless devices described above and that be used in alternative embodiments include: INSTEON, IrDA, Wireless USB, Z-Wave, and ZigBee.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of coordinating one or more linkable wireless devices operable in a personal area network (PAN) and a vehicle area network (VAN), the method comprising:

detecting, by a vehicle host device of a VAN, a PAN within a range of the VAN;

pairing one or more linkable wireless devices of the PAN to the vehicle host device;

creating a PAN identification code and adding the PAN identification code to a list of PANs having linkable wireless devices paired with the VAN;

determining a working channel of the PAN and adding the working channel to a scan list in the vehicle host device; and providing a communication link between the linkable wireless devices and a remote device via the vehicle host device;

wherein the linkable wireless devices of the PAN are associated with the PAN identification code and the working channel.

2. The method of claim 1, wherein the linkable wireless devices communicate with the remote device over the working channel.

3. The method of claim 1, further comprising detecting a portable host device of the PAN is moving toward an edge of a range of the VAN, and re-pairing the linkable wireless devices of the PAN to the portable host device.

4. The method of claim 1, further comprising a portable host device of the PAN entering a power saving mode after the linkable wireless devices have been paired to the vehicle host device.

5. The method of claim 4, further comprising detecting the portable host device is moving toward an edge of a range of the VAN, waking up the portable host device, and re-pairing the linkable wireless devices of the PAN to the portable host device.

6. The method of claim 1, wherein the linkable wireless devices communicate using one or more of INSTEON, infared, Wireless Universal Serial Bus, Z-Wave, and Zig-Bee.

7. The method of claim 1, wherein the linkable wireless devices include one or more of a push-to-talk (PTT) device, a remote speaker-microphone (RSM), and a camera.

8. The method of claim 1, further comprising detecting, by the VAN, a second PAN within a range of the VAN;

pairing one or more second linkable wireless devices of the second PAN with the vehicle host device;

creating a second PAN identification code and adding the second PAN identification code to a list of PANs having linkable wireless devices paired with the VAN;

determining a working channel of the second PAN and adding the working channel of the second PAN to a scan list in the vehicle host device; and providing a communication link between the second linkable wireless devices and a second remote device via the vehicle host device;

wherein the second linkable wireless devices of the second PAN are associated with the second PAN identification code and the working channel of the second PAN.

9. The method of claim 1, further comprising detecting, by the vehicle host device of the VAN, a plurality of PANs within a range of the VAN;

pairing linkable wireless devices of the PANs to the vehicle host device; and creating unique PAN identification codes for each PAN and adding the unique PAN identification codes to a list of PANs having linkable wireless devices paired with the VAN;

determining working channels of the each PAN and adding the working channels to a scan list in the vehicle host device; and providing a communication link between the linkable wireless devices and remote devices via the vehicle host device;

wherein the linkable wireless devices of the PANs are associated with the unique PAN identification code and the working channel of their associated PAN.

10. The method of claim 9, wherein the vehicle host device combines data streams received from the linkable wireless devices into a single data stream.

11. The method of claim 10, wherein the vehicle host device transmits the single data stream to an external server.

12. A wireless communication system, the system comprising:
a personal area network (PAN) including
a portable host device, and
one or more linked wireless devices paired to the portable host device; and
a vehicle area network (VAN) including
a vehicle host device;
wherein when the PAN comes into a range of the VAN, the vehicle host device pairs with the one or more linkable wireless devices of the PAN, and provides a communication link between the linkable wireless devices and a remote device;
wherein the vehicle host device creates a PAN identification code and adds the PAN identification code to a list of PANs having linkable wireless devices paired with the VAN, and wherein the vehicle host device determines a working channel of the PAN and adds the working channel to a scan list.

13. The wireless communication system of claim 12, wherein the linkable wireless devices communicate with the remote device over the working channel via the vehicle host device.

14. The wireless communication system of claim 13, wherein one of the portable host device and the vehicle host device detects the portable host device is moving toward an edge of a range of the VAN, and the portable host device re-pairs with the linkable wireless devices of the PAN.

15. The wireless communication system of claim 12, wherein the portable host device enters a power saving mode after the linkable wireless devices have been paired to the vehicle host device.

16. The wireless communication system of claim 12, wherein the linkable wireless devices include one or more of a push-to-talk (PTT) device, a remote speaker-microphone (RSM), and a camera, and communicate using one or more of INSTEON, infared, Wireless Universal Serial Bus, Z-Wave, and ZigBee.

* * * * *